(12) United States Patent
Hristov

(10) Patent No.: US 10,871,864 B2
(45) Date of Patent: Dec. 22, 2020

(54) SENSING APPARATUS

(71) Applicant: TouchNetix Limited, Hampshire (GB)

(72) Inventor: Luben Hristov, Sofia (BG)

(73) Assignee: TouchNetix Limited, Hampshire (GB)

(*) Notice: Subject to any disclaimer, the term of this patent is extended or adjusted under 35 U.S.C. 154(b) by 0 days.

(21) Appl. No.: 16/478,927

(22) PCT Filed: Sep. 28, 2017

(86) PCT No.: PCT/GB2017/052902
§ 371 (c)(1),
(2) Date: Jul. 18, 2019

(87) PCT Pub. No.: WO2018/134549
PCT Pub. Date: Jul. 26, 2018

(65) Prior Publication Data
US 2019/0391689 A1 Dec. 26, 2019

(30) Foreign Application Priority Data

Jan. 19, 2017 (GB) .................................... 1700920

(51) Int. Cl.
G06F 3/044 (2006.01)
G06F 3/041 (2006.01)

(52) U.S. Cl.
CPC ............ *G06F 3/044* (2013.01); *G06F 3/0414* (2013.01); *G06F 3/0416* (2013.01); *G06F 2203/04104* (2013.01)

(58) Field of Classification Search
CPC ...... G06F 3/044; G06F 3/0414; G06F 3/0416; G06F 2203/04104; G06F 2203/04105; G06F 2203/04106
See application file for complete search history.

(56) References Cited

U.S. PATENT DOCUMENTS

2003/0214485 A1* 11/2003 Roberts ................ G06F 3/0414
345/173
2014/0098030 A1 4/2014 Tang
(Continued)

FOREIGN PATENT DOCUMENTS

GB 2528855 A 2/2016
WO 2015/123322 A1 8/2015
(Continued)

OTHER PUBLICATIONS

International Search Report and Written Opinion for corresponding International Application No. PCT/GB2017/052902 dated Sep. 11, 2017.
(Continued)

*Primary Examiner* — Andrew Sasinowski
(74) *Attorney, Agent, or Firm* — Renner, Otto, Boisselle & Sklar, LLP

(57) ABSTRACT

A sensing apparatus for determining relative amounts of force applied to a sensing surface at a plurality of locations, the sensing apparatus comprising: a capacitive sensor element comprising the sensing surface, wherein the capacitive sensor element is moveably mounted; a displacement sensor element for detecting changes in the displacement of the capacitive sensor element; capacitive sensing circuitry coupled to the capacitive sensor element and configured to determine locations for a plurality of objects capacitively coupled to the sensing surface; displacement sensing circuitry coupled to the displacement sensor element and configured to determine changes in the displacement of the capacitive sensor element at a plurality of different locations; and processing circuitry configured to determine a location at which a net displacement load acts on the sensing surface from the determined changes in displacement of the
(Continued)

sensor element, and to establish relative amounts of the net displacement load on the determined locations.

17 Claims, 4 Drawing Sheets

(56) References Cited

U.S. PATENT DOCUMENTS

| | | |
|---|---|---|
| 2015/0138155 A1 | 5/2015 | Bernstein et al. |
| 2015/0324055 A1 | 11/2015 | Miller et al. |
| 2016/0062589 A1 | 3/2016 | Wan et al. |
| 2016/0098131 A1 | 4/2016 | Ogata et al. |
| 2016/0103544 A1 | 4/2016 | Filiz et al. |
| 2016/0266682 A1 | 9/2016 | Fu et al. |
| 2016/0378255 A1 | 12/2016 | Butler et al. |

FOREIGN PATENT DOCUMENTS

| | | | | |
|---|---|---|---|---|
| WO | WO 2015/123322 | * | 8/2015 | ............. G06F 3/044 |
| WO | 2016/036481 A1 | | 3/2016 | |

OTHER PUBLICATIONS

GB Combined Search and Examination Report for corresponding Patent Application No. GB 1700920.0 dated Jul. 12, 2017.

* cited by examiner

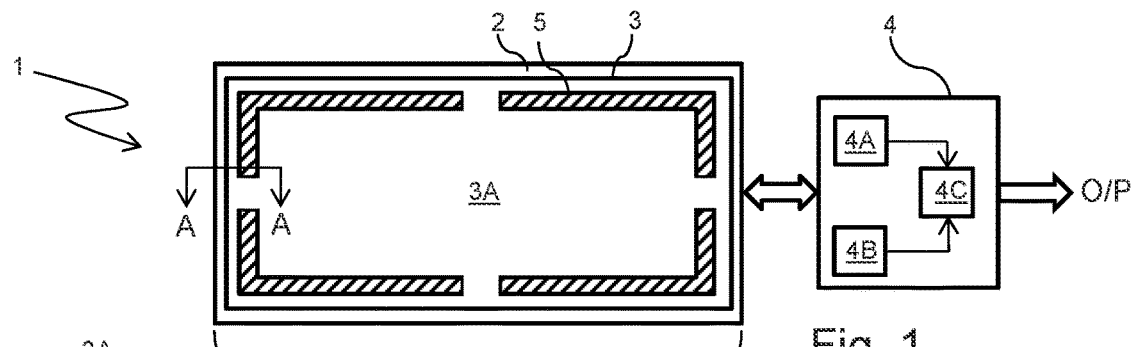
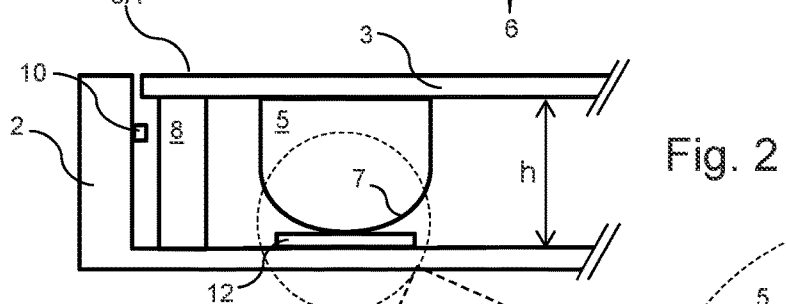
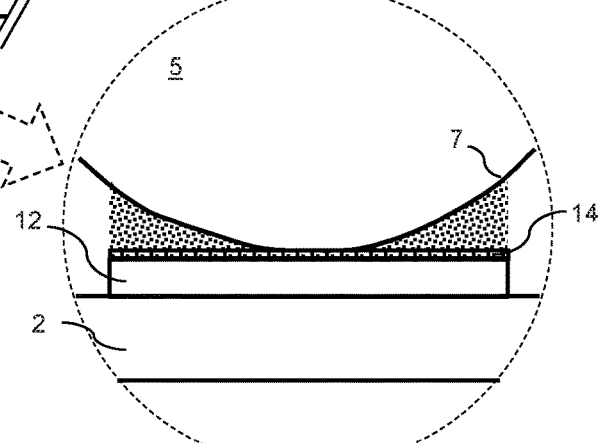
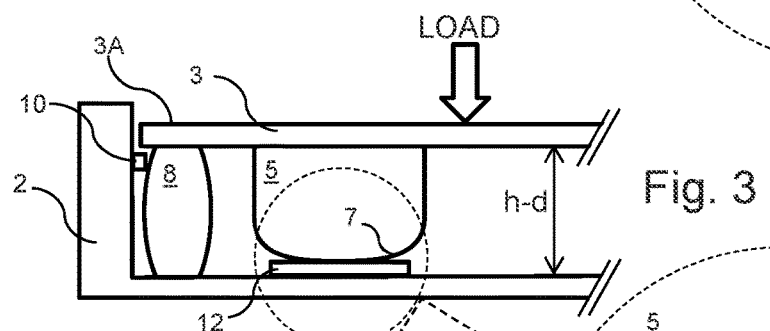
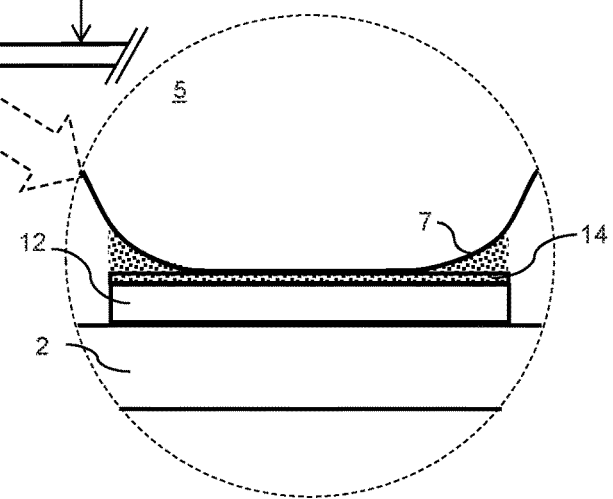
Fig. 1
Fig. 2
Fig. 3

SENSING APPARATUS

BACKGROUND OF THE INVENTION

The present invention relates to the field of capacitive sensing, and in particular to multi-touch capacitance measurement and displacement sensing, for example to apportion a net displacement load to respective ones of a plurality of sensed objects, such as a user's fingers, pressing on a capacitive sensing surface causing a displacement.

Capacitive sensing techniques have become widespread for providing touch-sensitive inputs, for example in computer tablets, mobile phones, and in many other applications. Touch sensitive input devices are generally perceived to be more aesthetically pleasing than input devices that are based on mechanical switches.

Most touch sensitive input devices are capable of detecting multiple inputs, i.e., multiple touches corresponding to one or more objects—for instance, many computer touchpads use two or more finger gestures to perform certain actions. Accordingly, touch sensitive input devices and associated controllers are capable of resolving the spatial positions of multiple simultaneous touches.

In some cases, the number of touches required to input a command may not be equal to the number of touches applied by the user. In the situation that the user applies too many touches, some conventional touch input devices cannot distinguish which of the sensed objects the user intended to use to input the command. This situation may arise, for example, where a user may wish to rest some of their fingers on a sensing surface of a touch sensitive input device without actually wishing to provide input. For instance, a user may keep their fingers resting on a touch sensitive keyboard and apply additional pressure with one or two of their fingers when they wish to activate a key or key combination. It can therefore be desirable to determine which of a plurality of objects applies the input command.

Other conventional touch sensitive input devices can measure a degree of capacitive coupling between objects and the input device which varies in accordance with applied pressure. However, the inventors have recognised variations in measured capacitance from changes in applied pressure are typically not in themselves sufficient for reliably distinguishing between objects simply resting on a touch sensitive input device and objects actively applying pressure, i.e., when inputting a command. For example, it is generally not possible to reliably determine the difference between a little finger pressing hard and a large finger pressing gently, and also the degree of areal spread is typically dependent upon the specific finger used, its orientation to the sensing surface, and the resilience of the finger to the pressure. For example, slender fingers generally do not spread out under load, even if applied at shallow angles, to the same extent as a less-slender finger. Equally, most fingers display relatively little areal/touch signal change when applied perpendicularly to the sensing surface.

Accordingly, in situations where multiple touches are sensed (e.g. from a plurality of fingers resting on a touch sensitive input device) it can be difficult to resolve which of the objects provides an input intended by the user, e.g. a selected key on a touch sensitive keyboard, based solely on data from measurements of the positions of the objects.

Thus, there is therefore a desire for apparatus and methods that can help to address these kinds of issue.

SUMMARY OF THE INVENTION

According to a first aspect of the invention there is provided a sensing apparatus for determining relative amounts of force applied to a sensing surface at a plurality of locations, the sensing apparatus including: a capacitive sensor element comprising the sensing surface, wherein the capacitive sensor element is moveably mounted relative to a frame of the sensing apparatus; a displacement sensor element for detecting changes in the displacement of the capacitive sensor element relative to the frame; capacitive sensing circuitry coupled to the capacitive sensor element and configured to determine locations for a plurality of objects capacitively coupled to the sensing surface; displacement sensing circuitry coupled to the displacement sensor element and configured to determine changes in the displacement of the capacitive sensor element relative to the frame at a plurality of different locations due to displacement loads applied by the plurality of objects on the sensing surface; and processing circuitry configured to determine a location at which a net displacement load acts on the sensing surface from the determined changes in displacement of the capacitive sensor element relative to the frame for the plurality of different locations, and to establish relative amounts of the net displacement load applied by respective ones of the plurality of objects based on the determined locations of the objects relative to the determined location at which the net displacement load acts on the sensing surface.

According to a second aspect of the invention there is provided a device comprising the sensing apparatus according to the first aspect.

According to a third aspect of the invention there is provided a method for determining relative amounts of force applied to a sensing surface of a capacitive sensor element at a plurality of locations, the capacitive sensor element moveably mounted relative to a frame, the method including: determining locations for a plurality of objects capacitively coupled to the sensing surface of the capacitive sensor element; calculating a net displacement load based on the changes in displacement of the capacitive sensor element at a plurality of different locations due to displacement loads applied by the plurality of objects on the sensing surface; determining a location at which a net displacement acts on the sensing surface from the determined changes in displacement of the capacitive sensor element relative to the frame for the plurality of different locations; and establishing relative amounts of the net displacement load applied by respective ones of the plurality of objects based upon the determined locations of the objects relative to the determined location at which the net displacement load acts on the sensing surface.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF THE DRAWINGS

The invention is now described by way of example only with reference to the following drawings in which:

FIG. 1 schematically represents a sensor element and controller element of a sensing apparatus according to certain embodiments of the invention;

FIG. 2 schematically shows in cross-section a portion of the sensor element of FIG. 1 in a non-displaced state;

FIG. 3 schematically shows in cross-section a portion of the sensor element of FIG. 1 in a displaced state;

DETAILED DESCRIPTION

Figure 4:
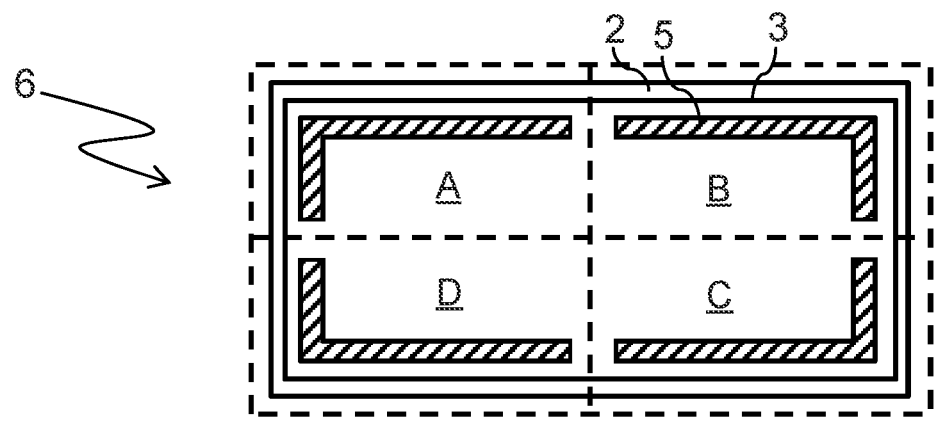
FIG. 4 schematically shows regions of a sensing surface of the sensor element whereby the displacement of each region can be sensed independently to provide data for determining a centre of press location where a net displacement load acts.

Aspects and features of certain examples and embodiments of the present invention are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

FIGS. 1, 2 and 3 schematically represent various aspects of a sensing apparatus 1 in accordance with certain embodiments of the invention. The sensing apparatus 1 comprises two main functional parts, namely a sensor element 6 and a controller element 4. FIGS. 1, 2 and 3 schematically represent various aspects of a sensing apparatus 1 in accordance with certain embodiments of the invention.

The sensor element 6 comprises a frame 2, a position sensitive capacitive sensing/sensor element 3 providing a two-dimensional sensing surface 3A that is displaceably mounted with respect to the frame 2, and a displacement sensing/sensor element, comprising electrodes 5, 12, for detecting a change in the displacement of the sensing surface 3A at different locations relative to the sensing surface 3A of the capacitive sensing element 3 with respect to the frame 2. The sensing surface 3A is displaceable relative to the frame 2 under the application of one or more displacement loads applied by one or more objects pressing on the sensing surface 3A. The controller element 4 is schematically shown to comprise capacitive sensing element measuring circuitry 4A (or sometimes referred to herein as capacitive sensing circuitry), displacement sensing element measuring circuitry 4B (or sometimes referred to herein as displacement sensing circuitry), and processing circuitry 4C.

The controller element 4 is configured to receive signalling from the displacement sensing element indicative of the sensed relative displacements of the different regions of the sensing surface 3A and to identify from the displacement of these different regions a centre of press location P. The centre of press location P corresponds to a location on the sensing surface 3A where a net displacement load acts and thus may sometimes be referred to as the location at which the net displacement load acts on the sensing surface 3A. The net displacement load is representative of the summation of the individual displacement loads applied by each of the objects pressing on the sensing surface 3A. The centre of press location P is a representative location on the sensing surface 3A at which the net displacement load can be considered to act to provide a displacement of the capacitive sensing element 3 corresponding to the measured (physical) displacement of the sensing surface 3A. The centre of press location P may also be referred to as a centre of pressure location and is the location on a body (capacitive sensor element 3) at which the summation of a pressure field (applied forces/loads from each of the sensed objects) acts and results in an applied force (net displacement load).

The controller element 4 is additionally configured to receive signalling from the capacitive sensing element 3 to identify the positions of the plurality of objects on the sensing surface 3A based on a capacitive coupling between the sensing surface 3A and the plurality of objects. Using the signalling from the capacitive sensing element 3 and the displacement sensing element, the controller element 4 (or more specifically the processing circuitry 4C thereof) apportions the net displacement load to respective ones of the sensed objects based upon the locations of the sensed objects relative to the centre of press location P. In this context, apportioning the net displacement load should be understood to mean establishing relative amounts of the displacement load applied by the respective ones of the plurality of objects. In this way, each of the sensed objects can be assigned a contribution of the total displacement load/force. The way in which the apportioned load information is used may vary depending upon the application at hand but, for example, the information may be used to determine which one(s) of the sensed objects input an input command by the user operating the sensing apparatus 1. For example, in a keyboard application, displacement loads will generally be applied to select functions or provide inputs, e.g., key presses, associated with the operation of an apparatus for which the sensing apparatus 1 provides a user interface.

Thus the sensing apparatus of FIG. 1 includes a displacement sensing function for sensing the changes in the displacements of the sensing surface 3A of the capacitive sensing element 3 at different locations and a capacitive coupling sensing function for sensing the locations of objects adjacent the capacitive sensing element 3. The displacement sensing function is provided by the displacement sensing element and associated displacement sensing element measuring circuitry 4B in the controller element 4. Together the displacement sensing element and displacement sensing element measuring circuitry 4B can be considered as a displacement sensor. The displacement sensing element measuring circuitry 4B may sometimes be referred to herein as the displacement sensor controller or the controller of the displacement sensor. The capacitive coupling sensing function is provided by the capacitive sensing element 3 and associated capacitive sensing element measuring circuitry 4A in the controller element 4. Together the capacitive sensing element 3 and capacitive sensing element measuring circuitry 4A can be considered as a capacitive sensor. The capacitive sensing element measuring circuitry 4A may sometimes be referred to herein as the capacitive sensor controller or the controller of the capacitive sensor. Measurements of displacements by the displacement sensing element measuring circuitry 4B and measurements of the capacitive coupling for objects adjacent the capacitive sensing element 3 are processed by the processing circuitry 4C in the controller element 4 to apportion the net displacement load to respective ones of the sensed objects in accordance with the principles described herein.

FIG. 1 schematically represents the sensor element 6 in plan view and the controller element 4 in highly schematic form (i.e. as a functional block). FIGS. 2 and 3 respectively show portions of the sensor element 6 of the sensing apparatus 1 in cross-section (taken on the line A-A represented in FIG. 1), with FIG. 2 showing the sensing apparatus 1 in a non-displaced (rest) state and FIG. 3 shows the sensing apparatus 1 in a displaced state.

The sensing apparatus 1 is arranged to measure displacement of the capacitive sensing element 3 relative to the frame 2, for example in response to a user pressing on or applying displacement loads to the capacitive sensing element 3. In this example implementation, the displacement sensor function is based on measuring changes in capacitive couplings associated with deformable electrodes 5 arranged between the capacitive sensing element 3 and frame 2 and reference electrodes 12. In FIG. 1, four deformable electrodes 5 are positioned at each corner of the capacitive sensing element 3 and have an L-shape extending parallel with corresponding sides of the capacitive sensing element 3. Four reference electrodes 12 having the same shape as the deformable electrodes 5 are positioned below the deformable electrodes 5 to create four pairs of deformable electrodes 5 and reference electrodes 12. Each deformable and reference electrode pair 5, 12 is configured to sense a displacement of an associated region of the sensing surface 3A as described in more detail below.

The capacitive couplings between the electrode pairs 5, 12 are measured by the displacement sensing element measuring circuitry 4B, for example using conventional capacitive measurement techniques. Displacement of the sensing surface 3A relative to the frame 2 causes a change in the capacitive couplings between the deformable electrodes 5 and the reference electrodes 12 as the deformable electrodes 5 deform under application of displacement loads. It will be appreciated the use of capacitive sensing technologies to detect displacement may be convenient in certain implementations in that similar controller technologies can be used for sensing changes in displacement and for sensing the presence and positions of objects adjacent the sensing surface 3A. Also, a capacitive-based displacement sensing approach can be configured to provide an indication of a degree of displacement, as opposed to a simple binary detection, which can be used to determine a centre of press location P with greater precision. The output signalling from the displacement sensor may be a continuous signal capable of taking substantially any value within the sensing range of the displacement sensor element, or one of a series of discrete values selected based on whether or not the sensed displacement falls within certain sub-ranges across the sensing range. However, it will be appreciated the specific displacement sensing technology is not significant to the principles described herein and in other implementations other types of displacement sensing technology may be used. For example, in some implementations the sensing surface 3A may be configured to press against a mechanical switch. In general, any sensing technology that is able to provide an indication of physical displacements of different regions of the sensing surface 3A may be adopted.

The sensing surface 3A of the capacitive sensing element 3 is the side of the capacitive sensing element 3 to which displacement loads are applied during normal use. The application of an example load during use, e.g. corresponding to a user pressing a finger on the capacitive sensing element 3, is schematically shown in FIG. 3 by the arrow labelled "LOAD". For ease of explanation, the side of the sensing apparatus 1 to which the load is applied in normal use may sometimes be referred to herein as the "upper" or "outer" side of the sensing apparatus 1 (or similar terminology such as "top"), with the other side being referred to as "lower" or "inner" (or similar terminology, such as "bottom"). Thus, the sensing surface 3A of the capacitive sensing element 3 shown uppermost in the orientation of FIGS. 2 and 3 may sometimes be referred to as the upper/outer/top surface of the capacitive sensing element 3. Likewise, the lowermost surface of the capacitive sensing element 3 for the orientation of FIGS. 2 and 3 may sometimes be referred to as the bottom/lower/inner surface. Corresponding terms may similarly be used in respect of other parts of the sensing apparatus 1 in accordance with the orientation shown in the relevant figures. However, it will be appreciated this terminology is used purely for convenience of explanation and is not intended to suggest a particular orientation of the sensing apparatus 1 should be adopted in normal use. For example, although in the orientation of FIGS. 2 and 3 the upper surface of the sensor element 6 is shown uppermost, the sensor element 6 could equally be used in a downward facing configuration or facing outwards from a vertical surface according to the implementation at hand. More generally, the sensing apparatus 1 may be incorporated in a portable device (such as a tablet computer or mobile telephone), and in that case the orientation in use will vary according to how a user happens to be holding the device.

The frame 2 provides a structural support for the capacitive sensing element 3 and will typically be connected to, or comprise an integral part of, an apparatus in which the sensing apparatus 1 is provided. The frame 2 may comprise any suitable structural material, for example it may be formed from metal or plastic. The frame 2 in this example defines a recess/opening into which the capacitive sensing element 3 is received and moveably supported therein by a support element 8 arranged around a peripheral part of the capacitive sensing element 3. In this example the movable mounting of the capacitive sensing element 3 relative to the frame 2 is provided by virtue of the support element 8 comprising a resiliently compressible material. An upper edge of the support element 8 is bonded to the underside of the capacitive sensing element 3 and a lower edge of the support element 8 is bonded to the frame 2. Conventional bonding techniques can be used for bonding the support element 8 to the other parts of the sensing apparatus 1, for example having regard to bonding techniques appropriate for the materials involved.

The support element 8 in this example is thus generally in the form of a rectangular ring arranged around a peripheral part of the capacitive sensing element 3. The support element 8 has a generally rectangular cross-section when in its relaxed state (as shown in FIG. 2), although when the support element 8 is compressed by virtue of one or more loads being applied to the capacitive sensing element 3, its sides may bow out to accommodate the movement, as schematically indicated in FIG. 3. It will, however, be appreciated that other shapes could be used in accordance with established mounting practices. For example, more complex shapes for the support element 8 may be chosen to provide different degrees of compressibility according to the degree to which the support element is already compressed. The support element 8, as opposed to being a continuous rectangular ring, may instead be a series of discrete elements extending, for example, along the lengths of the four separate deformable and reference electrode pairs 5, 12.

The capacitive sensing element 3 may be provided with a stop 10 to limit the extent to which the support element 8 may be compressed (i.e. to limit the extent to which the capacitive sensing element may be displaced relative to the frame element 2). In this example such a stop is provided by a suitably arranged protrusion 10 from a side wall of the recess defined by the frame element 2. This protrusion 10 may extend all around the recess or may be provided at a number of discrete locations around the recess.

The support element 8 in this example comprises an elastomeric material having an appropriate degree of rigidity and compressibility according to the application at hand (i.e. providing a desired level of resistance to compression). In some cases there may be a desire for a material having relatively low compressibility, thereby requiring a relatively high load to generate a given displacement of the capacitive sensing element 3 relative to the frame element 2. Conversely, in some cases there may be a desire for a material having relatively high compressibility, thereby requiring a relatively low load to generate a given displacement of the capacitive sensing element 3 relative to the frame element 2. This will be a question of design choice. For example, in the context of the sensor element 6 forming a user interface, a designer may choose how hard the user must press to cause a given displacement. This may be done, for example, to balance the risk of accidental activation against requiring too great a force for activation. A material having the desired degree of compressibility may be selected from modelling or empirical testing, for example.

With reference to FIGS. 2 and 3, the deformable electrodes 5 are arranged between the capacitive sensing element 3 and the frame 2. The electrodes 5 are arranged in a generally rectangular path around (i.e. within and adjacent to) a peripheral region of the capacitive sensing element 3. Each of the deformable electrodes 5 have a generally "D" shaped cross-section with a lower curved wall 7, which may also be referred to as a contact surface 7 for the deformable electrode 5. The specific geometry of the deformable electrodes 5, e.g. in terms of their cross-sectional size, separation from the peripheral edge of the capacitive sensing element 3, and the extent to which they extend around the whole periphery, is not significant to the principles described herein and may vary depending on the specific construction of the sensing apparatus 1.

The deformable electrodes 5 may be formed in a number of different ways. In this example the deformable electrodes 5 comprise a suitably profiled elastomeric conductive foam; however, other materials may also be used. Electrical connections to the separate deformable electrodes 5 allows for separate measurements of the changes in displacements of the different regions of the sensing surface 3A to be made using one or more conductors in contact with the deformable electrodes 5.

Between the deformable electrodes 5 and the frame 2 are the reference electrodes 12. The reference electrodes 12 are generally provided in alignment with a respective deformable electrode 5 and follow a corresponding path beneath the deformable electrode 5. An upper surface of the reference electrode 12 is provided with an electrical insulator layer 14 (shown schematically in the magnified parts of FIGS. 2 and 3). The insulator layer 14 prevents the overlying deformable electrode 5 from coming into direct electrical contact with the reference electrode 12 when the deformable electrode 12 is pressed against the reference electrode 12 during displacement of the capacitive sensing element 3 towards the frame 2.

The reference electrodes 12 may be provided in a number of different ways, for example as a conductive trace deposited on the frame 2. The insulator layer 14 may also be provided in a conventional manner, for example comprising a plastic film or layer of plastic/resin encapsulant over the reference electrode 12. It will, however, be appreciated that different techniques can be used in different implementations. Although the reference electrode 12 is schematically represented in FIGS. 2 and 3 as being disposed on top of the frame 2, in other examples the reference electrode may be embedded within the frame 2. If the frame 2 is conductive, the reference electrode 12 may be insulated therefrom. It will be appreciated the reference electrode 12 and insulator layer 14 might typically be relatively thin compared to the other elements of the sensor element 6 shown in FIGS. 2 and 3, but these figures are not drawn to scale with the reference electrode 12 (and its layer of insulation 14) shown with exaggerated thickness in the cross-sections of FIGS. 2 and 3 for ease of representation.

As noted above, FIG. 2 schematically represents the sensor element 6 in a rest state with no displacement loads applied to the capacitive sensing element 3. In this example the gap between the upper surface of the frame element 2 and a lower surface of the capacitive sensing element 3 is, as indicated in FIG. 2, h. This gap h corresponds with the height of the support element 8 in its relaxed state. In this example the support element 8 is sized to provide a gap h that is slightly less than the height of the deformable electrodes 5, such that the deformable electrodes 5 are in slight compression so there is a portion of the contact surfaces 7 for which there is no free space (air gap) between the deformable electrodes 5 and the frame 2, even when in the rest (non-displaced) state.

FIG. 3 schematically represents the sensor element 6 in a displaced state in which a displacement load is applied to the capacitive sensing element 3 by an object. The displacement load may, for example, be provided by a user's finger pressing on the outer surface of the capacitive sensing element 3 or by a non-biological object such as a stylus. The support element 8 and the deformable electrode 5 are both compressed under the action of the displacement load allowing the capacitive sensing element 3 to move along a displacement direction towards the frame 2 by an amount d. The magnitude of the displacement d will be a function of the force (load) applied and the combined resilience of the support element 8 and the corresponding deformable electrode 5. The capacitive sensing element 3 in FIG. 3 is schematically shown as remaining parallel to the frame when displaced, but in general it may be expected the displacement element 3 may be tilted depending on the location of the load (i.e. the value of d may be different at different positions across the displacement element 3). In this example the magnitude of the displacement is assumed to be around 0.1 cm.

As a consequence of the deformable electrode 5 being squashed under the displacement load, the curved contact surface 7 is pressed harder against the underlying insulator layer 14. This causes the contact surface 7 to flatten against the insulator layer 14, thereby reducing the overall volume between the deformable electrode 5 and the reference electrode 12 as compared to the rest state represented in FIG. 2. The space between the deformable electrode 5 and the reference electrode 12 is schematically shown with shading in FIGS. 2 and 3, and it can be seen how the shading in FIG. 3 occupies a smaller area than the shading in FIG. 2.

Because the volume of the space between the deformable electrode 5 and the reference electrode 12 is reduced under the displacement load, the capacitive coupling between the deformable electrode 5 and the reference electrode 12 increases when the displacement load is applied. The controller element 4, and in particular the displacement sensing element measuring circuitry 4B, is configured to measure a characteristic of the capacitive coupling associated with the two electrodes, to thereby output an indication of the relative displacements of regions of the sensing surface 3A of the capacitive sensing element 3. Connections between the displacement measuring circuitry 4B and the respective electrodes can be established in accordance with conventional techniques, for example using appropriate wiring. There are various different ways in which a characteristic of the capacitive coupling between the two electrodes can be measured. For example, the mutual capacitive coupling between the two electrodes could be measured by applying a drive signal to one of the electrodes and measuring the extent to which the drive signal is coupled to the other of the electrodes. Alternatively, the self-capacitance of one of the electrodes could be measured with respect to a reference potential whilst the other electrode is connected to the reference potential (e.g. a system ground or other system reference potential). For simplicity the system reference potential may sometimes be referred to herein as a system ground or earth, but it will be appreciated the actual potential itself may be arbitrary and is not significant (e.g. it could be 0V, 5V or 12V, or any other value according to the implementation at hand). In yet another example, one of the electrodes may comprise two components which are capacitively coupled to one another. For example the reference electrode 12 of FIGS. 1 to 3 may be replaced with a reference electrode comprising a pair of parallel or interdigitated conductors which are insulated from one another but in a relatively close proximity on the frame 2, with the gap between them underlying the deformable electrode 5. The mutual capacitive coupling between the two conductors comprising the reference electrode could be measured by applying a drive signal to one of the conductors and measuring the extent to which the drive signal is coupled to the other of the conductors. The component of the drive signal coupled between the electrodes will generally be reduced as the overlying deformable electrode is compressed on to them under the displacement load. Nonetheless, it will be appreciated the specific capacitive sensing technology used to detect changes in the capacitive coupling between the deformable electrode 5 and the reference electrode 12 is not significant to the principles described herein. In general, the sensing apparatus 1 is able to detect the displacement of different regions of the sensing surface 3A, and this may be detected using any known displacement sensing technology.

As described above, the displacement sensor is configured to sense the change in displacement at different locations/different regions of the sensing surface 3A of the capacitive sensing element 3. FIG. 4 schematically shows, in plan view, the sensor element 6 of FIG. 1 divided into four regions in the plane of the sensing surface 3A. The four regions here correspond to four different locations at which the change in displacement is to be measured. Each region is shown by the dashed lines and is labelled from A to D. Herein, when referring to a specific region, the region shall be reference by the letter given in FIG. 4; for example, the region in the top-left part of FIG. 4 is referred to as "region A". The regions in FIG. 4 are shown in an enlarged manner and extend beyond the edges of the capacitive sensing element 3 in order to clearly show which part of the sensing surface 3A is being referred to. However, it will be understood in practice that the regions do not extend beyond the outer edges of the capacitive sensing element 3. Additionally, the size/area of the regions may be greater or smaller than that shown depending upon the physical size of the displacement sensor element. Equally, the regions presented in FIG. 4 are merely one example of how the capacitive sensing element 3 can be divided into regions, and hence the regions may be defined differently in both spatial arrangement/size and in number in other implementations.

As can be seen in FIG. 4, each region is associated with a corresponding deformable electrode and reference electrode pair 5, 12. During application of a load by one or more objects, the different regions of the sensing surface 3A are displaced from the general position shown in FIG. 2. Depending upon the location and strength of the applied loads, the different regions of the sensing surface 3A can be relatively displaced by different amounts. For instance, the sensing surface 3A can tilt during the application of displacement loads such that, for example, regions A and D are displaced by larger amounts than regions B and C. This will be the case when a larger average displacement load is applied in/to the regions A and D compared to the regions B and C. Furthermore, it may be that region A is displaced by a larger extent than region D, which again indicates a larger average displacement load is applied in/to region A than in/to region D. The displacement sensor in this implementation is configured to sense the displacements of these regions individually using the corresponding electrode pairs 5, 12. For example, the displacement sensor may determine that region A is displaced by a first amount (e.g., 0.1 cm), region B is displaced by a second amount (e.g., 0.05 cm), and so on.

Turning now to the capacitive coupling/sensing function, the capacitive sensing element 3 is configured to sense the locations of the one or more objects disposed on the sensing surface 3A of the capacitive sensing element 3. The capacitive sensing element 3 may be based on any known design, and may be constructed from a single layer or multiple, stacked layers, e.g., a capacitive sensor layer and a protective cover layer. In any case, the uppermost surface (i.e., the surface furthest from the frame 2 in FIGS. 2 and 3) may be considered to provide the sensing surface 3A adjacent which objects are detected.

The capacitive sensing element 3 includes a number of conductive electrodes or traces positioned through, or on a surface of, the capacitive sensing element 3. These electrodes are electrically connected to the capacitive sensing element measuring circuitry 4A in the controller element 4, which is configured to determine the positions of objects adjacent the capacitive sensing element 3 based on sensing a capacitive coupling of the objects with the capacitive sensing element 3. As will be appreciated there are many well-established techniques for capacitively sensing the positions of multiple objects over a two-dimensional sensing surface, and any of these technologies may be adopted for the capacitive coupling/capacitive position sensing function of the sensor element 6. In this regard, the specific pattern of electrodes/traces provided across the sensing surface and the associated capacitance measurement techniques provided by the capacitive sensing element measuring circuitry 4A will depend on the specific sensing technology adopted. As is conventional, the electrodes/traces may be made from any suitable conductive material, such as copper or transparent indium tin oxide (ITO) deposited on a substrate. In one example, the electrodes are arranged in a grid with overlapping horizontal (X) and vertical (Y) electrodes in a well-established configuration for capacitive sensing.

In essence, signalling associated with the capacitive sensing element 3 provides an indication of a degree of capacitive coupling between objects overlying the sensing surface and the electrodes comprising the sensing surface 3A in addition to information on the positions/locations of the objects. The specific nature of the signalling and the manner in which it indicates a degree of capacitive coupling will depend on the sensing technology adopted. The textbook "Capacitive Sensors: Design and Applications" by Larry K. Baxter, August 1996, Wiley-IEEE Press, ISBN: 978-0-7803-5351-0 [1] summarises some of the principles of conventional capacitive sensing techniques that may be used for measuring capacitance characteristics in accordance with various implementations. More generally, and as already noted, any established techniques for determining the positions of the objects on the sensing surface based on a capacitive coupling could be adopted.

One example technique for measuring a degree of capacitive coupling uses so-called mutual capacitance measurement techniques. Mutual capacitance can be measured by applying a time varying drive signal to one electrode (e.g., a horizontal electrode) and measuring the extent to which the drive signal is capacitively coupled to another electrode (e.g., a vertical electrode) using conventional capacitance measurement techniques. The magnitude of the mutual capacitive coupling between the electrodes is influenced by the presence of nearby objects, e.g., human fingers. Changes in mutual capacitance measurements may therefore be considered to represent changes in capacitive couplings between nearby objects and the sensing surface.

Another example technique for measuring a degree of capacitive coupling uses so-called self-capacitance measurement techniques. Self-capacitance can be measured by determining the capacitance of an array of electrodes with respect to a reference potential. For example, the self-capacitance of a rectangular array of electrodes can be individually monitored. Changes in the measured self-capacitance for a particular electrode can be considered to represent a change in capacitive coupling between an object adjacent that particular electrode.

It should be understood that the above discussion sets out only some example ways in which capacitive sensing may be implemented for the capacitive sensing element 3 and it will be appreciated various other established techniques, or combination of established techniques, may be used for different implementations.

The capacitive sensing element 3 in this example is in the form of a planar rectangle, but other shapes may be used. The size of the capacitive sensing element 3 may be chosen according to the implementation at hand to provide the desired area over which a displacement load/force is to be detected. Purely for the sake of a specific example, it will be assumed here the capacitive sensing element 3 has a size of around 30 cm (width)×15 cm (height)×0.3 cm (thickness). The capacitive sensing element 3 in this example is formed generally of a non-conductive material, for example a glass or plastic material, but includes the conductive electrodes/traces. The capacitive sensing element 3 may be transparent or opaque according to the application at hand. For example, in some implementations a display screen may be provided below the sensor element 6. In this case the capacitive sensing element 3 (and any parts of the frame 2 overlying the display screen) should be transparent, at least to some extent, to allow a user to see the display screen through the sensor element 6. In other cases there may be a desire from a design perspective to hide what is behind the capacitive sensing element 3 (for example because there is internal wiring or structural elements of an apparatus in which the sensor element 6 is mounted which are not intended to be visible to the user for aesthetic reasons). In this case the capacitive sensing element 3 and/or frame 2 may be opaque. In such cases, the sensing surface 3A may include markings or other form of indicia representing certain functions associated with the device in which the sensing apparatus 1 is to be used, e.g., the letters of the alphabet at positions on the capacitive sensing element 3 corresponding to a conventional keyboard's layout.

As noted above, the sensing apparatus 1 also comprises the controller element 4 which includes the capacitive sensing element measuring circuitry 4A, the displacement sensing element measuring circuitry 4B, and the processing circuitry 4C. The controller element 4 thus comprises circuitry which is suitably configured/programmed to provide the functionality described herein using conventional programming/configuration techniques for capacitive sensors. While the capacitive sensing element measuring circuitry 4A, displacement sensing element measuring circuitry 4B, and processing circuitry 4C are schematically shown in FIG. 1 as separate elements for ease of representation, it will be appreciated that the functionality of these components can be provided in various different ways, for example using a single suitably programmed general purpose computer, or field programmable gate array, or suitably configured application-specific integrated circuit(s)/circuitry or using a plurality of discrete circuitry/processing elements for providing different elements of the desired functionality.

In accordance with conventional techniques, the capacitive sensing element measuring circuitry 4A is configured to receive signalling from the capacitive sensing element 3 and to perform processing thereon to establish the positions of objects adjacent the sensing surface 3A of the capacitive sensing element 3. The specific processing will depend on the specific arrangement of the conductive electrodes/traces of the capacitive sensing element 3. Depending upon the resolution of the capacitive sensing element 3, there may be multiple detection nodes for each detected object (i.e., multiple measurements of capacitive coupling at different position). The capacitive sensing element measuring circuitry 4A may be configured to interpolate measurements for each sensing node position to provide a single position estimate for each sensed object.

The output signalling from the capacitive sensing element 3 will, generally, be indicative of the strength or magnitude of the capacitive coupling between the objects and capacitive sensing element 3, e.g., a value of the measured capacitance for each object. Typically, this will be encoded in the voltage signal that is firstly applied by the capacitive sensing element measuring circuitry 4A to the capacitive sensing element 3 and then returned back to the circuitry 4A. As will be explained in more detail below, the present disclosure makes use of the positions/locations of the sensed objects. To this end, the capacitive sensor (i.e., the circuitry 4A thereof) may be implemented in a manner to provide a simple binary output indicative of whether or not an object has been detected (and its associated position). This can be implemented based upon a threshold, whereby capacitive couplings exhibiting a strength below this threshold are subsequently ignored by the controller element 4. For instance, objects that are only lightly resting on the sensing surface 3A, and thus have a low capacitive coupling, can be considered not to contribute to the application of displacement loads and thus ignored in the processing performed by the controller element 4. Equally, objects that are near-by, but not touching, the sensing surface 3A (so-called near touch) will likely exhibit a lower capacitive coupling than objects actually in contact with the sensing surface 3A. These objects, which do not contribute to the net displacement load but are nevertheless sensed by the capacitive sensing element 3, can be ignored by the controller element 4 based upon a comparison with the threshold. The threshold detection may be implemented in the capacitive sensing element measuring circuitry 4A, which would not output co-ordinates of a sensed object having a capacitive coupling strength less than the threshold, or in the processing circuitry 4C which may receive signalling indicative of the coordinates of each sensed object in addition to a strength and ignore any objects having a strength less than the threshold when apportioning the forces. Depending upon the application at hand, however, near touch objects displaying a sufficient capacitive coupling may be included in any processing performed by the controller element 4.

The displacement sensing element measuring circuitry 4B is configured to convert the signalling indicative of the sensed capacitive couplings output by the displacement sensing element (i.e., deformable and reference electrode pairs 5, 12) to signalling indicating the relative displacements of each region. Therefore, the signalling includes both a measure of the relative displacement and an indication of which region senses the relative displacement for each of the regions (or alternatively only the regions for which a relative displacement is sensed).

Thus, the apparatus represented in FIGS. 1 to 4 is operable to determine both the positions/locations of a plurality of objects over the sensing surface 3A of the capacitive sensing element 3 and also relative displacements of regions of the capacitive sensing element 3 relative to the frame 2, for example due to a user pressing on the capacitive sensing element 3. These measurements may be used, in accordance with the principles described herein, to apportion the total or net displacement load to respective ones of the plurality of sensed objects applying individual displacement loads to the capacitive sensing surface 3A.

The processing circuitry 4C of the controller element 4 is configured to receive the signalling indicative of the positions/locations of the sensed objects from the capacitive sensing element measuring circuitry 4A in addition to the signalling indicative of the relative displacement measurements of each region from the displacement sensing element measuring circuitry 4B as indicated by the arrows in FIG. 1. The processing circuitry 4C performs various processes on received data (as explained below) and is therefore sometimes referred to herein as the processing element or processing element of the control element 4.

The processing circuitry 4C uses the received relative displacements of each region to calculate a centre of press location P from the relative displacements of each region. Calculations and methods for determining a centre of press location P from a number of displacement measurements are generally known in the field of displacement sensors and a skilled person may select any of these methods suitable for the application at hand. This may include a suitable ratiometric calculation. For example, the processing circuitry 4C may use the relative displacement measurements in addition to the locations/distances of the electrode pairs 5, 12 relative to a reference point on the sensing surface 3A (e.g., the centre thereof) stored/programmed in advanced to determine the centre of press location P, which may include calculating average displacements in horizontal (X) and vertical (Y) directions relative to the centre of the sensing surface 3A and converting the average displacement into X and Y coordinates to provide the centre of press location P.

Purely by way of example only, the processing circuitry 4C is configured in some implementations to calculate the X and Y position coordinates of the centre of press location P, here labelled as $P_X$ and $P_Y$ respectively, based upon the relative displacements of the different regions of the capacitive sensing element 3 as measured by the displacement sensing element. With reference to FIG. 4, in implementations where there are four displacement sensors (i.e., four electrode pairs 5, 12) located at and extending from the corner positions of the capacitive sensor element 3, the centre of press location can be calculated using the appropriate formula from the equations listed below:

$$P_X = K_{max}\left(1 - \frac{(S_{TL} + S_{BL})}{(S_{TL} + S_{BL}) + (S_{TR} + S_{BR})}\right)$$

for case when $(S_{TL} + S_{BL}) \geq (S_{TR} + S_{BR})$ $$P_X = K_{max}\frac{(S_{TR} + S_{BR})}{(S_{TL} + S_{BL}) + (S_{TR} + S_{BR})}$$

for case when $(S_{TL} + S_{BL}) < (S_{TR} + S_{BR})$ $$P_Y = K_{max}\left(1 - \frac{(S_{TL} + S_{TR})}{(S_{TL} + S_{TR}) + (S_{BL} + S_{BR})}\right)$$

for case when $(S_{TL} + S_{TR}) \geq (S_{BL} + S_{BR})$ $$P_Y = K_{max}\frac{(S_{BL} + S_{BR})}{(S_{TL} + S_{TR}) + (S_{BL} + S_{BR})}$$

for case when $(S_{TL} + S_{TR}) < (S_{BL} + S_{BR})$ where $S_{TL}$ is the relative displacement as measured by the displacement sensor at the top-left part of the capacitive sensing element 3 (i.e., region A), $S_{TR}$ is the relative displacement as measured by the displacement sensor at the top-right part of the capacitive sensing element 3 (i.e., region B), $S_{BR}$ is the relative displacement as measured by the displacement sensor at the bottom-right part of the capacitive sensing element 3 (i.e., region C), $S_{BL}$ is the relative displacement as measured by the displacement sensor at the bottom-left part of the capacitive sensing element 3 (i.e., region D), and $K_{max}$ is the maximum reported/sensed position (for example, position 4095). In this regard, $K_{max}$ is considered to be a constant value for a given group of touches but varies depending upon the maximum reported position for each group of touches.

The processing circuitry 4C, when receiving the signalling from the displacement sensing element measuring circuitry 4B indicative of the relative displacements, is configured to identify which formula to use for $P_x$ and $P_y$ based upon a comparison of the displacements as identified above. Once the appropriate formulas are identified, the processing circuitry 4C is configured to calculate $P_x$ and $P_y$ and set these coordinates on the sensing surface 3A as the centre of press location P.

It should be understood that the above formulas are merely an example of formulas that can be used for calculating the centre of press location P. The above formulas are specific to the physical construction of the displacement sensor elements, namely the fact that the displacement sensor elements are positioned at the corners of the capacitive sensing element 3. In other implementations where the displacement sensor elements are located along the edges of the capacitive sensing element 3 (that is, where the displacement sensor elements extend along the top edge, the bottom edge, and the left and right edges respectively) the formulas used are different to those described above. In such a case the formulas take the form of:

$$P_X = K_{max}\left(1 - \frac{S_L}{(S_L + S_R)}\right) \text{ for case when } S_L \geq S_R$$

$$P_X = K_{max}\frac{S_R}{(S_L + S_R)} \text{ for case when } S_L < S_R$$

$$P_Y = K_{max}\left(1 - \frac{S_B}{(S_T + S_B)}\right) \text{ for case when } S_B \geq S_T$$

$$P_Y = K_{max}\frac{S_T}{(S_T + S_B)} \text{ for case when } S_B < S_T$$

where $S_T$ is the relative displacement as measured by the displacement sensor positioned along the top edge of the capacitive sensing element 3, $S_B$ is the relative displacement as measured by the displacement sensor positioned along the bottom edge of the capacitive sensing element 3, $S_L$ is the relative displacement as measured by the displacement sensor positioned along the left edge of the capacitive sensing element 3, $S_R$ is the relative displacement as measured by the displacement sensor positioned along the right edge of the capacitive sensing element 3, and $K_{max}$ is the maximum reported/sensed position (for example, position 4095).

It should be apparent to the skilled person that formulas used to calculate the centre of press location P can be formulated for any configuration of capacitive sensing element 3 and displacement sensing elements 5, 12 using the principles described above. In this way, the processing circuitry 4C can calculate/estimate a centre of press location P on any sized/shaped capacitive sensing element 3.

In addition, the processing circuitry 4C is configured to apportion the total force to/between the sensed objects using the determined centre of press location P, the locations of the sensed objects, and the relative displacements of the sensing surface 3A.

Figure 5:
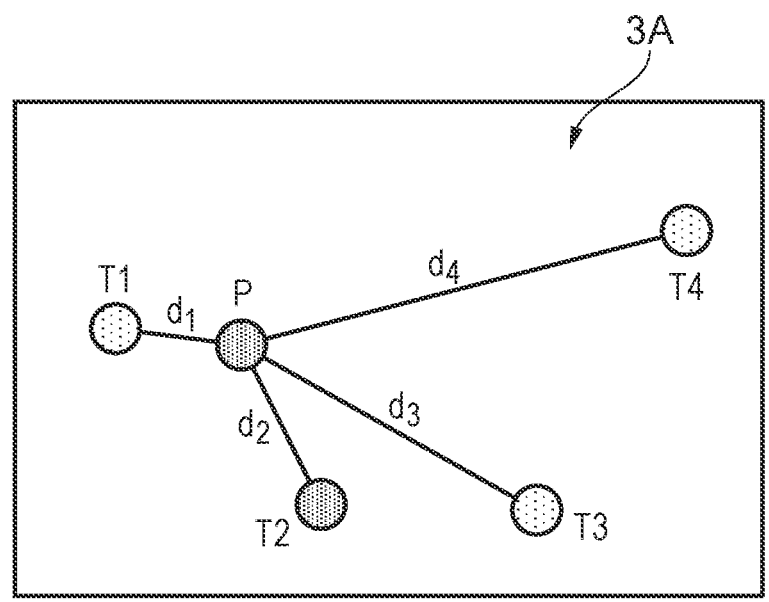
FIG. 5 schematically shows, in plan view, distances between a plurality of objects sensed on the sensing surface of the sensor element and the centre of press location as determined in accordance with certain embodiments of the invention.

A first implementation of how the processing circuitry 4C apportions the force/load to respective ones of the sensed touches is described with reference to FIG. 5. In FIG. 5, it will it be assumed a user has four fingers resting on the capacitive sensing surface 3A, and applies a load/force to displace the sensing surface 3A using these fingers. This may be in order to select a particular input associated with that position on the sensing surface 3A, for example. However, it will be appreciated the specific reason for a user wishing to provide any particular user input is not significant to the principles described herein.

FIG. 5 shows, in plan view, an example distribution of four objects or touches on the sensing surface 3A for the purposes of explaining the principles of the present disclosure. Each touch is indicated by a circular dot labelled from T1 to T4 which are indicative of positions on the sensing surface 3A corresponding to the sensed objects as detected by the capacitive sensor (i.e., the capacitive sensing element 3 and capacitive sensing element measuring circuitry 4A). Also shown in FIG. 5 is the centre of press location P, also indicated by a circular dot, indicative of the location as determined by the processing circuitry 4C.

The processing circuitry 4C is configured, in this example, to calculate the relative distances between the location of the centre of press location P and each of the sensed touches T1 to T4. These distances are labelled $d_1$ to $d_4$ in FIG. 5 where the subscript corresponds to the respective touch. That is, each touch (corresponding to an object sensed by the capacitive sensor) is associated with a distance from the centre of press location P. The distances $d_1$ to $d_4$ are scalar quantities and can be calculated using trigonometric relations, generally given by the following equation $$d_i = \sqrt{(T_{i,x}-P_x)^2+(T_{i,y}+P_y)^2} \qquad (1)$$

where i is an integer indicating the specific touch (in this case the total number of touches s four so i runs between 1 to 4), $T_{i,x}$ is the X position coordinate of touch i, $T_{i,y}$ is the Y position coordinate of touch i, $P_x$ is the X position coordinate of the centre of press location P, and $P_y$ is the Y position coordinate of the centre of press location P.

Using these distances $d_1$ to $d_4$, the processing circuitry 4C can attribute/apportion the total force/load F using a ratiometric approach based upon the values of the determined distances. The force apportioned to each touch, denoted herein by $F_i$ where i indicates the correspond touch, is calculated using the following equation $$F_t = \frac{Fd_i}{d_t} \qquad (2)$$

where $$d_t = \frac{1}{\sum_i \frac{1}{d_i}} \qquad (3)$$

From Equations (2) and (3), it can be seen that forces are apportioned inversely proportionally to the respective distances $d_i$ of the touch from the centre of press location P. So, taking FIG. 5 as an example, touch T1 is assigned the greatest proportion of the total force F because touch T1 is relatively closer to the centre of press location P than touches T2 to T4, while touch T4 is assigned the smallest proportion of the total force F because touch T4 is relatively further away from the centre of touch location P than touches T1 to T4. Note the sum of the individual forces $F_i$ is equal to the total force F.

The total force F can be estimated based on the sum of the total measured displacement of the capacitive sensing element 3 in accordance with any suitable method known in the art. Purely by way of example, the total force can be calculated using the relative displacements of each region as sensed by each electrode pair 5, 12 and knowledge of the spring constant of the elastomeric support element 8. In this regard, one can model each displacement sensing element 5, 12 and the support element 8 as a spring using Hooke's Law, whereby the force/load experienced by each region can be represented as $$F_{Rj}=kD_{Rj} \quad (4)$$

where $F_{Rj}$ is the force or load applied to region j, j representing the individual regions (e.g., from A to D), $D_{Rj}$ is the displacement of region j as measured by the displacement sensor disposed in/corresponding to region j, and k is the spring constant of the support element 8. Note the spring constant k here is assumed to be the same for each region j of the capacitive sensing element 3 but this may not be the case for every implementation. The summation of the forces $F_{Rj}$ for each region (that is, the sum of $F_{Rj}$ over all j) provides an estimate of the total force F applied to the sensing surface 3A from each of the sensed touches T1 to T4.

Accordingly, the processing circuitry 4C is able to apportion the net displacement load to each of the sensed touches/objects so as to identify, for each object, which proportion of the load is being applied by the respective object. This information can be output, in the form of signalling, to the device or apparatus that the sensing apparatus 1 is connected to, i.e., a smartphone, tablet computer, touch sensitive keyboard, etc. The device is provided with software configured to process the output signalling in accordance with any desired manner.

In most conventional devices, this will involve comparing the touch position(s) of objects to areas or ranges defined on the sensing surface 3A corresponding to certain allowable input commands to be input into the device to select an input command. In accordance with the present disclosure, such software may also take into consideration the proportion of the force applied by each object. The output signalling from the processing circuitry 4C can therefore be used to identify from a plurality of sensed objects which of the objects should be considered when determining the input command to be input by the device based on the object(s) having the greatest proportion of the load attributed thereto. For example, a user resting their fingers on the sensing surface 3A in the manner of a touch sensitive keyboard may use two of the plurality of fingers resting on the sensing surface 3A to input a command. That is, the user will additional pressure to the sensing surface 3A using the two fingers. Accordingly, for each finger, the proportion of the net displacement load apportioned to the two fingers will be greater than the proportion of the net displacement load to the resting fingers. Therefore, software in the device coupled to the sensing apparatus 1 can be programmed to consider the fingers having the greatest proportion of the touch to apply the input command and use the locations of these touches to determine which input command is effected using conventional techniques (i.e., by comparing the positions of the touches to position arranges/areas associated with different input commands/keys on the keyboard). In other words, the output signalling can be used to disambiguate which of a plurality of sensed objects applied an input command.

In other cases, the output signalling can be used to determine an input command based upon the distribution of the forces applied by the sensed touches. Because the proportion of the forces can be appropriately apportioned to each touch, possible input commands can be coded into the force distribution patterns. For example, a distribution of forces whereby diagonally opposed touches are the strongest (e.g., upper left and lower right touches of a group of touches sensed on the sensing surface 3A) can be attributed to one input command (e.g., up and left arrow combination), while a different pattern of distributed forces (e.g., upper and lower touches of a group of touches) can be used to effect a different input command (e.g., up arrow). For example, such implementation could be used for navigating a cursor on a display screen, or rotating a displayed object/picture.

The specific use of the signalling will depend upon the application at hand but it should be appreciated that the present disclosure provides signalling to the associated device that includes object/touch positions for a plurality of sensed objects in addition to the proportion of the net displacement load applied by each of the identified objects.

In some implementations, calculation of the centre of press location P and/or the distances $d_1$ to $d_4$ may involve a more complicated relationship than described above. This may be the case in particular for certain geometries of capacitive sensing elements 3 that do not provide a linear response to applied pressure. In some cases, the influence of the touch positions on the centre of press location P may be stronger or weaker in one axis/direction of the capacitive sensing surface 3 compared to an orthogonal direction. For instance, in the case of an oblong shaped sensing surface 3A having its shorter side parallel to the Y-direction, touches (or components thereof) in the Y-direction have a weaker influence on the centre of position location P. In this case, when calculating the centre of press location P (or the distances d), the processing circuitry 4C can be configured to calculate an effective distance from the centre of press location P in order to re-linearize the system. In effect, this approach makes the effective position of the sensed touch further from or closer to the centre of press location. In such an implementation, parameters in the one of the aforementioned directions can be scaled according to a scaling factor or function. For example, if the response to an applied pressure is half as effective in the Y direction as compared to the X direction of a capacitive sensing element 3, then the processing circuitry 4C may be configured to multiply components of the distances in the Y direction by a factor of two to compensate. More complex functions (continuous or piecewise) may also be employed depending upon the exact response/shape of the capacitive sensing element 3. Alternatively, a pre-defined look-up table can be provided to enable an appropriate rescaling of the distances with the look-up table being determined empirically during manufacture or testing of the sensing apparatus 1.

The method described in conjunction with FIG. 5 provides, in most cases, a good approximation of the distribution of forces between the sensed touches. However, in some situations, the above described technique can be prone to providing an incorrect distribution of forces.

Figure 6:
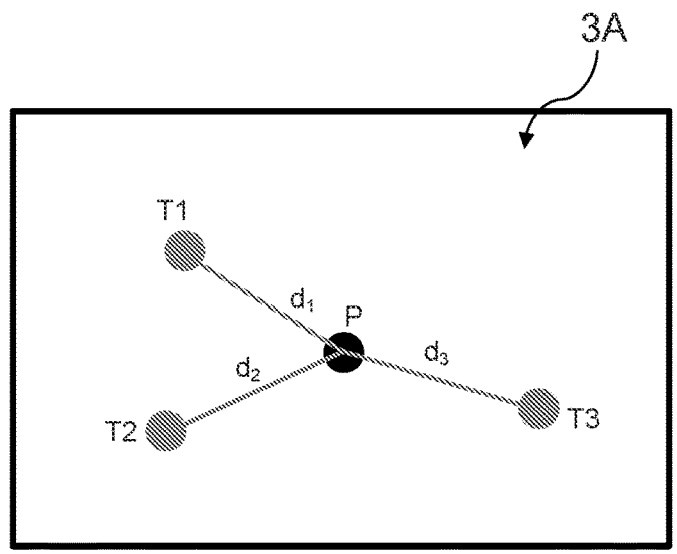
FIG. 6 schematically shows, in plan view, an example arrangement of a plurality of objects sensed on the sensing surface having equal distances from the centre of press location to demonstrate a situation where the displacement load is not apportioned correctly.

FIG. 6 shows, in plan view, the sensing surface 3A of the capacitive sensing element 3 showing an example arrangement of three sensed touches, labelled T1 to T3 and represented by circular dots, provided at locations on the sensing surface 3A. Additionally, the centre of press location P, as calculated according to any of the techniques above, is also shown. In this example, which is provided to highlight the limitations of the ratiometric implementation described above, the distances $d_1$ to $d_3$ for each of the touch points T1 to T3 relative to the centre of press location P as calculated by Equation (1) are all equal. Using Equations (2) and (3) yields the result that each of the touches T1 to T3 is provided with one third (F/3) of the total force. However, in reality, the force at T3 ($F_3$) is approximately equal to the sum of the forces at T1 and T2 (i.e., $F_1+F_2$) in order to provide the centre of touch location P in the middle as shown in FIG. 6. A more accurate distribution for the above example in FIG. 6 is $F_3$ being about one half (F/2) of the total force, while $F_1$ and $F_2$ are each about one quarter (F/4) of the total force.

Therefore, according to a second implementation, the processing circuitry 4C is configured to use a vector approach to apportion the total force to respective ones of the plurality of touches. Such a vector approach overcomes some of the limitations associated with the first implementation as described in FIG. 6.

Figure 7A:
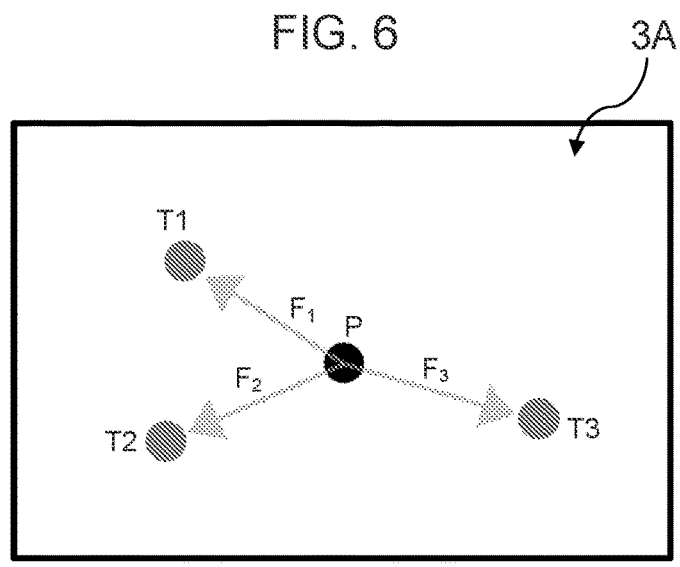
FIG. 7A schematically shows, in plan view, vectors associated with each of the sensed objects on the sensing surface in relation to the centre of press location according to certain other embodiments of the invention.

FIG. 7A shows, in plan view, the sensing surface 3A of the capacitive sensing element 3 showing an example arrangement of three sensed touches, labelled T1 to T3 and represented by circular dots, provided at locations on the sensing surface 3A. Additionally, the centre of press location P, as calculated according to any of the techniques above, is also shown. In contrast to the examples shown in FIGS. 5 and 6, in FIG. 7A vectors (labelled $F_1$ to $F_3$) are shown for each of the three touches. The vectors are shown as originating from the centre of press location P and are oriented towards the respective sensed touches. However, it should be understood that this is merely a diagrammatic representation of vectors associated with the applied forces and is not meant to signify the physical application of a force in this direction (indeed, the physical direction of the forces will, generally, be directed into the plane of FIG. 7A at the touch positions T1 to T3).

Figure 7B:
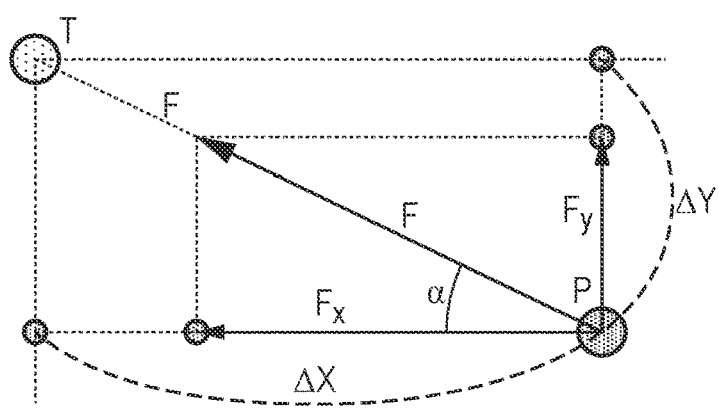
FIG. 7B schematically shows the components of a vector shown in FIG. 7A and the relationships between the angle of the vector and magnitude of each component.

FIG. 7B schematically highlights certain relationships for a single, arbitrary touch point T relative to a centre of press location P. The quantities $\Delta x$ and $\Delta y$ are shown respectively on FIG. 7B, which are the differences in the X and Y positions respectively between the centre of press location P and the touch point T. The force vector F and its projections in the X and Y directions, represented by $F_x$ and $F_y$ respectively, are also shown. FIG. 7B also shows a relative angle $\alpha$, which is the angle subtended by the force vector F and the X component of the force vector F.

The vectors shown represent projections of the associated forces for each touch about the centre of press location P. The centre of press location P by definition is in the location at which the total force acts and therefore, at this point, the sum of the projections of the forces in the X and Y directions respectively should be zero. In other words, using the centre of press location P as a reference point in X-Y coordinate space (i.e., in a plane in which the sensing surface 3A lies), one can impose the relationship that projected forces (or components thereof) in the X direction should sum to zero because there should be no net component of force acting in a direction from the centre of press location P (as this is the location at which the net applied force/load should act). Equally, the projected forces in the Y direction should also sum to zero for similar reasons. In the vector approach, the magnitude of each of the projected vectors should also sum to the total force F. Using these three relationships, one can form a series of simultaneous equations which, when solved, provide the proportion of the net displacement load applied at the respective touches.

Using the fact that the force between touch positions $T_i$ and the centre of press location P is proportionally reciprocal to the distance therebetween (that is, $F_i = a/d_i$; $F_x = a/\Delta x$; and $F_y = a/\Delta y$), these three relationships can be expressed mathematically as $$|F_1| + |F_2| + |F_3| = F \quad (5)$$

$$|F_1|\Delta_{1x} + |F_2|\Delta_{2x} + |F_3|\Delta_{3x} = 0 \quad (6)$$

$$|F_1|\Delta_{1y} + |F_2|\Delta_{2y} + |F_3|\Delta_{3y} = 0 \quad (7)$$

where $T_{ix}$ is the X position coordinate of touch $T_i$, $T_{iy}$ is the Y position coordinate of touch $T_i$, $\Delta_x$ is the difference in position between the touch position $T_{ix}$ and the centre of press location $P_x$ and $\Delta_{iy}$ is the difference in position between the touch position $T_{iy}$ and the centre of press location $P_y$.

Equations (5) to (7) can be represented in matrix form as follows $$\begin{vmatrix} 1 & 1 & 1 \\ \Delta_{x1} & \Delta_{x2} & \Delta_{x3} \\ \Delta_{y1} & \Delta_{y2} & \Delta_{y3} \end{vmatrix} = \begin{vmatrix} F \\ 0 \\ 0 \end{vmatrix} \quad (8)$$

Therefore, by knowing the $\Delta_{xi}$, $\Delta_{yi}$ and F, one can find the inverse matrix of Equation 8 to find to the solution to the system of equations. In the above example of FIG. 7A, this will yield a single solution for the apportioned forces.

The vector approach can also be extended to four or more touches; however, Equation (8) no longer yields a single solution in this case. One approach to compensate for this addition degree of freedom is to find the least-square solution. However, this can be processing intensive. Alternatively, it is possible to add extra relationships to the system of linear equations represented in Equation 8 to impose a single solution.

The number of extra relationships to be added depends upon the number of sensed touches. Generally, for N detected touches (where N is an integer greater than 3), N−3 additional relationships are added to the system of linear equations. The type of the relationship is not significant and, depending upon the apparatus or positions of the touches, different types of relationships may be added as mathematically appropriate. By way of example, the relationships can be relationships between the distances between the touch points T1 to TN and the centre of press location P similarly to those described in the ratiometric approach. In this case, the relationship to be imposed is $$d_l F_l - d_m F_m = 0 \quad (9)$$

where l and m are the indices for the pair of touches having the smallest angle subtended by the corresponding projected vectors. For example, with reference to FIG. 7A, if index l is equal to 1, the index m is equal to 2 because projected vector $F_2$ is the vector that subtends the smallest angle with respect to T1 (approximately 45° in FIG. 7A). For comparison, projected vector $F_3$ subtends an angle closer to 180° with respect to projected vector $F_1$. Suitable algorithms can be used to calculate the relevant angles (e.g., trigonometric relations) and to present the angles in order from smallest to largest. Calculations that result in the duplication of angles can be removed in order to speed up the algorithm.

Generally, the additional relations can be represented as $$d_{pl} F_{pl} - d_{pm} F_{pm} = 0 \quad (10)$$

where p is the number of added relations for paired touches (i.e., runs from 1 to N−3).

These new relationships are then inserted into equation (8), using the fact that force $F_i$ is proportional to the inverse of distance (i.e., $F_i = a/d_i$) in order to form a modified matrix. An example of the modified matrix is given below using generic coefficients $q_{xy}$, where indices x and y denote the position in the matrix.

$$\begin{vmatrix} 1 & 1 & 1 & \dots & 1 \\ \Delta_{x1} & \Delta_{x2} & \Delta_{x3} & \dots & \Delta_{xN} \\ \Delta_{y1} & \Delta_{y2} & \Delta_{y3} & \dots & \Delta_{yN} \\ q_{11} & q_{12} & q_{13} & \dots & q_{1N} \\ q_{21} & q_{22} & q_{13} & \dots & q_{1N} \\ \dots & \dots & \dots & \dots & \dots \\ q_{p1} & q_{p2} & q_{p3} & \dots & q_{pN} \end{vmatrix} \begin{vmatrix} F \\ 0 \\ 0 \\ 0 \\ 0 \\ \dots \\ 0 \end{vmatrix} \quad (11)$$

To calculate the generic coefficients $q_{xy}$, the following sequence is performed in accordance with some implementations. Firstly, the processing circuitry 4C is configured to identify the angles between touches store these values in an array of records. Each record contains:

- the angle to the neighbouring touch of a particular touch pair (the angle field of the record);
- the touch number, e.g., 1 for touch T1, of a first one of the touches of the pair of touches (Ta field in the record);
- the touch number of the second one of the touches, e.g., 2 for touch T2, the pair of touches (Tb field in the record);
- the distance from the centre of press location P to the position on the sensing surface 3A of the first touch, e.g., d1, ($d_a$ field in the record);
- the distance from the centre of press location P to the position on the sensing surface 3A of the second touch, e.g., d2, ($d_b$ field in the record);

Secondly, the array is sorted based upon the angular field, in the order of minimum to maximum, to identify pairs of touches having the smallest angles therebetween for the sensed touches. Thirdly, for each row of the matrix, i.e., for each value of index x which runs from 1 to p, the coefficients $q_{n}$, are set such that

- if index y is different from Ta and Tb (y is not equal to the numerical value stored in Ta or Tb), then set $q_{xy}$ to zero;
- if index y is equal to Ta, then set $q_{xy}$ to the value of $d_a$ from the current record;
- if index y is equal to Tb, then set $q_{xy}$ to the value of $-d_b$ from the current record (note the inclusion of the negative sign).

Once the modified matrix is populated with the appropriate values, the processing circuitry 4C is configured to determine the determinant of the modified matrix to ensure it is non-zero. If the determinant is not non-zero (i.e., there is not a single solution to the matrix), then the processing circuitry 4C is configured to obtain the next pair of touches in the sorted array (i.e., the pair having the next smallest angle) and produce a new modified matrix based upon this pair. That is, assuming there are three additional relationships (p is equal to three), instead of using the records for the first to third smallest angles, the records for the second to fourth smallest angles are used instead. This process can be repeated until a non-zero determinant is found. When multiple pairs have non-zero determinant, the processing circuitry 4C is configured to select pairs of touches providing positive answers for the force distribution. Any pairs that provide negative answers can still be used but require further manipulation to yield positive answers in accordance with conventional mathematically techniques.

Accordingly, if the determinant of the created matrix is zero, then a single solution can be found and the forces $F_i$ can be apportioned correctly to respective ones of the sensed touches T1 to TN. Such a technique therefore uses a combination of projected vectors in addition to ratiometric relationships to apportion the forces to a plurality of touches, whereby there are more than three sensed touches. The processing circuitry 4C outputs signalling including an indication of the position of each touch and the associated apportioned force as described above.

In some situations, the determinant of the matrix can be used to provide indications about the accuracy or state of the apportioned forces. For example, a larger value of the determinant can indicate that the apportioned forces have a greater chance of matching the actual physical distribution of forces. Other indications of quality may also be obtained from the value of the determinant.

Using the vector approach can provide the correct apportioning of forces even if the touch points are distributed in a manner whereby the distances between two or more touch points and the centre of press location P are equal (or approximately equal). It should be appreciated that the processing circuitry 4C is configured to generate and solve a suitable matrix depending upon the number of detected touches. In other words, the processing circuitry will add N−3 rows and columns to the matrix when N is equal to three or more (note that no rows or columns are added in the case N=3, thus the matrix given by equation (8) is used in such a case). Therefore, the processing circuitry 4C configured to use the vector approach is able to automatically accommodate any number of touches.

In some cases, however, the centre of press location P and the locations of the touches T1 to TN may not be determined absolutely correctly due to, e.g., the non-linearity of the sensor element 6 or the sensitivity/resolution of the capacitive sensor 3. In these cases, the vector approach may not yield a suitably accurate distribution of forces because of the inaccuracies in the calculated position of the centre of press location P and/or the touch positions, which may be significant for high precision applications of the sensing apparatus 1.

Figure 8A:
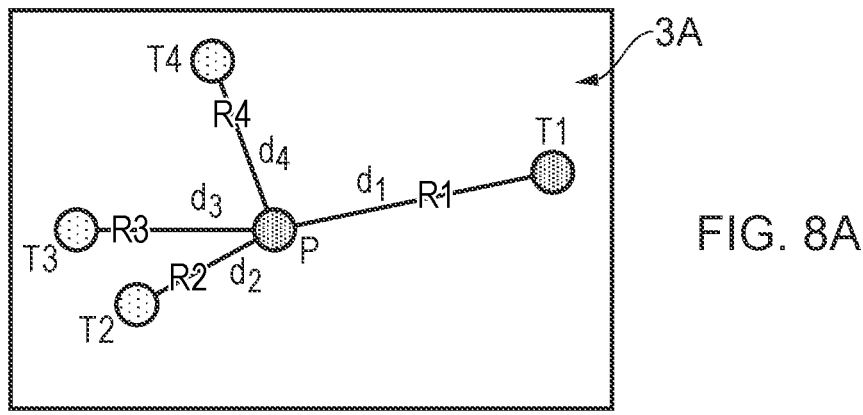
FIG. 8A shows schematically, in plan view, an example arrangement of a plurality of sensed touches/objects on the sensing surface in relation to the centre of press location including the distances between each of the sensed objects and the centre of press location and reciprocal distance coefficients being the reciprocal of the distances between the sensed objects and the centre of press location according to certain other embodiments of the invention.

A third implementation for apportioning a net displacement load to respective ones of detected touches is now described. The third implementation uses a combined trigonometric and ratiometric approach to apportion a displacement load. FIG. 8A shows, in plan view, the sensing surface 3A of the capacitive sensing element 3 showing an example arrangement of four sensed touches, labelled T1 to T4 and represented by circular dots, provided at locations on the sensing surface 3A. Additionally, the centre of press location P, as calculated according to any of the techniques above for this arrangement of touches and applied forces, is also shown. FIG. 8A also shows the distances d1 to d4 between the locations of each of the touches and the centre of press location P.

The processing circuitry 4C is configured to determine the distances $d_1$ to $d_4$ between each of the sensed touches T1 to T4 and the centre of press location P using any appropriate technique, for example, by using Equation (1) as described above in the first implementation. The processing circuitry 4C then calculates the reciprocal of the distances. This can be done in a manner similar to the ratiometric approach above, for example, using the formula $$Ri = \frac{d_t}{d_i} \quad (12)$$

where Ri is the reciprocal distance coefficient for touch i and $d_t$ is defined above in equation (3). Ri provides a weighting that allows the net displacement load to be apportioned to the touch points inversely proportionally to the distance from the centre of press location P.

In addition, the processing circuitry 4C is configured to calculate angles α between the closest neighbouring touches. In other words, the processing element 4C is configured to find, for each touch location, the smallest angle about the centre of press location between two adjacent touches. One can think of angle α as the angle subtended by lines connecting each of the locations of the touches to the centre of press location. The nearest neighbour can be determined in any number of suitable ways. For example, the nearest neighbour can be determined by calculating the distances between a given touch, e.g., T1 and each of the other touches, e.g., touches T2, T3 and T4.

Figure 8B:
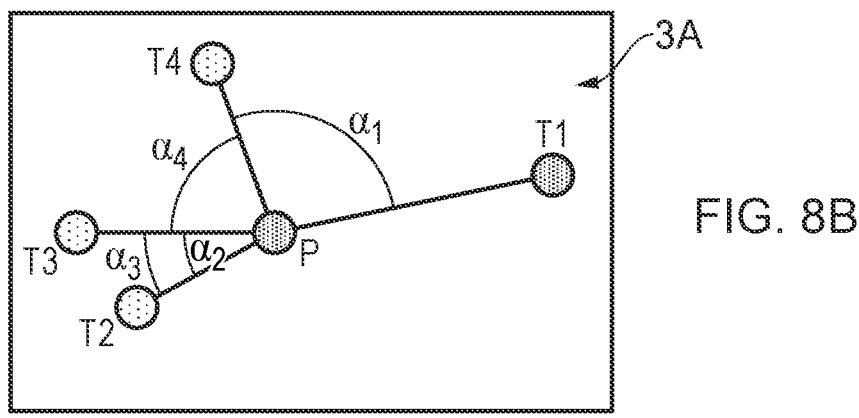
FIG. 8B shows schematically, in plan view, the example arrangement of a plurality of sensed touches/objects of FIG. 8A and additionally shows, for each sensed object, the angle between the object and its nearest neighbouring object.

FIG. 8B shows the same distribution of touches as in FIG. 8A on the sensing surface 3A and the associated distances between the centre of press location P and the locations of the touches, but further shows angles $α_1$ to $α_4$ for each of the touches T1 to T4. Note that angles $α_2$ and $α_3$ are the same in this arrangement of touches on the sensing surface 3A—that is, touch T2's neighbouring touch is touch T3 and vice versa. Touch T1's nearest neighbour is touch T4 but touch T4's nearest neighbour is touch T3. It can be seen from FIG. 8B that the distance between touch T1 and touch T4 is smaller than the distance between touch T1 and touch T2 and between touch T1 and touch T3; therefore, touch T4 is selected as touch T1's nearest neighbour in this implementation.

The angles $α_i$ can be calculated using trigonometric relationships. For example, the processing circuitry 4C can calculate the relationships by determining the differences in angles relative to a reference horizontal and/or vertical axis for each touch T1 to T4, for example as shown in FIG. 7B, and then use an appropriate algorithm to find the angles between neighbouring touches.

Figure 8C:
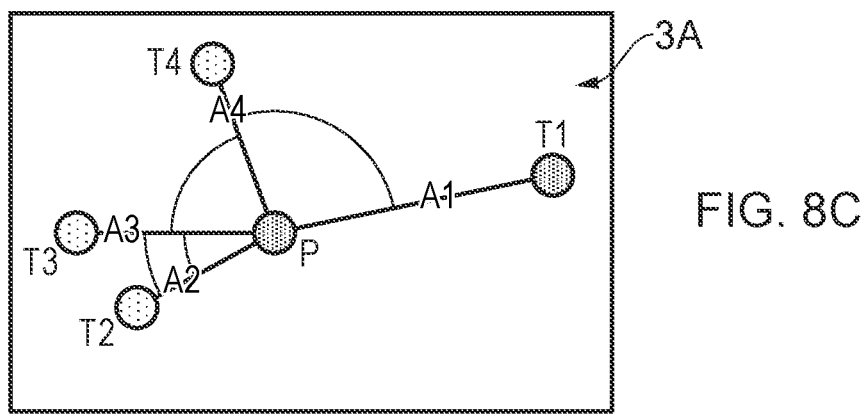
FIG. 8C shows schematically, in plan view, the example arrangement of a plurality of sensed touches/objects of FIG. 8B and additionally shows angular coefficients for each sensed object which vary from 0 to 1 based upon the angle between the object and its nearest neighbouring object.

Once the angles $α_i$ have been calculated, the processing circuitry is configured to calculate an angular coefficient Ai for each of the touches. FIG. 8C shows the same distribution of touches as in FIGS. 8A and 8B on the sensing surface 3A and the associated distances between the centre of press location P and the locations of the touches, but further shows the angular coefficients A1 to A4. The angular coefficients Ai are calculated by applying a mathematical formula to the determined angle (such as the sine of the angle) in such a way that the angular coefficient changes from 0 to 1 as the angle changes from 0 to 90°. In this way, depending upon the value of the calculated angle, the angular coefficient has a larger of smaller weighting.

Figure 8D:
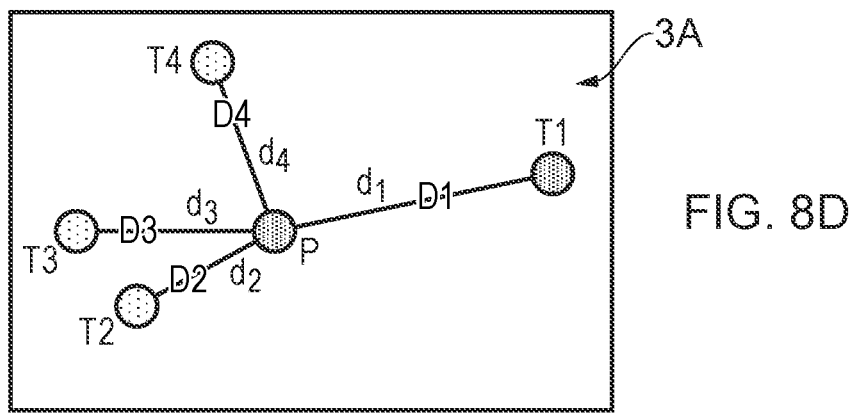
FIG. 8D shows schematically, in plan view, the example arrangement of a plurality of sensed touches/objects of FIG. 8A and additionally shows a reversed distance coefficient for each sensed object, the reversed distance coefficient related to the relative distance between the position of the sensed object to the centre of press location and the position of the nearest neighbour to the centre of press location.

The processing circuitry 4C is also configured to calculate a reversed ratio distance coefficient Di between distances of nearest neighbours. FIG. 8D shows the same distribution of touches as in FIGS. 8A to 8C on the sensing surface 3A and the associated distances between the centre of press location P and the locations of the touches, but further shows the reversed ratio distance coefficient Di for each of the touches T1 to T4, labelled D1 to D4 in FIG. 8D.

The reversed ratio distance coefficient is calculated according to the following equation $$Di = \frac{d_{neighbour}}{d_i + d_{neighbour}} \quad (13)$$

where $d_{neighbour}$ is the distance of the nearest neighbouring touch to the centre of press location P. It should be understood that $d_{neighbour}$ will be equal to one of the distances $d_1$ to $d_4$, which one will depend upon the specific arrangement of sensed touches.

Using the coefficients above, the processing circuitry 4C now calculates a proportion coefficient for each touch Ti, given here by Pi, according to the following equation $$Ai(Ri+Di)=Pi \quad (14)$$

The proportion coefficient Pi is a coefficient that can be used to apportion the net displacement load to a touch Ti. Equation (14) can be understood as follows.

The coefficient Ai is an angular coefficient that depends upon the angle between two neighbouring touches. When the angle is close to 90°, i.e., Ai is close to 1, then Pi is close to its maximum value. This means that a larger proportion of the net displacement load is apportioned to the touch Ti because Ti represents a sensed touch that is isolated from other touches and therefore has a greater influence on the force distribution. In contrast, when Ai is close to 0°, i.e., Ai is close to 0, then Pi is close to its minimum value. This means that a smaller proportion of the force is apportioned to the touch Ti because Ti represents a sensed touch that is close to its neighbouring touch and therefore the touch Ti has a reduced influence on the force distribution. One can think of this as approximating the two closely neighbouring touches as a single touch, whereby the two touches contribute together the same proportion as the single touch.

The coefficient Ri is the reciprocal distance coefficient and varies inversely proportionally to the distance of the touch point Ti from the centre of press location P. Accordingly, as with the ratiometric approach discussed in relation to FIG. 5, Pi has a larger value when the touch is closer to the centre of press location P and, conversely, Pi has a smaller value when the touch is further from the centre of press location P.

The coefficient Di is a reversed distance coefficient which is influenced by the distances of the neighbouring touch. If the neighbouring touch is relatively closer to the centre of press location P than touch Ti, then Di takes a relatively small value meaning less of the net force is apportioned to touch Ti, i.e. Pi is smaller. Conversely, when the neighbouring touch is relatively far from the centre of press location, Di takes a relatively large value meaning more of the net displacement load is apportioned to touch Ti, i.e., Pi is larger.

Accordingly, using the three coefficients as described above means that the proportion coefficient is able to take into account the distances between the sensed touches and the centre of press location P, the angles between touches, and the angles to closest touches.

The force Fi apportioned to each touch Ti can then be calculated using the following equation $$Fi = \frac{FPi}{\sum_i Pi} \quad (15)$$

Note that dividing by the sum of Pi over all Pi normalises the proportion coefficients and is an example of a normalisation process. Other normalisation techniques known in the art may be used in other implementations as appropriate.

Thus, in accordance with the third implementation described above, the net displacement load is apportioned to the respective ones of sensed objects based not only upon properties of the respective sensed object itself (i.e. distance) but by taking into account the corresponding relationships to neighbouring sensed objects. In this way, situations where objects are arranged on the sensing surface 3A that causes an improper apportioning of the forces can be avoided. Moreover, apportioning forces in this way can provide a smoother force distribution in comparison to other techniques above, particularly when transitioning from one configuration to another (e.g., when adding another relationship to the matrix of simultaneous equations as discussed with respect to the vector approach). Once the net displacement load has been apportioned to respective ones of the sensed objects using Equation (15), the processing circuitry 4C outputs signalling to the device associated with the sensing apparatus 1, wherein the output signalling includes an indication of the position of each sensed object and the associated apportioned force as described above.

Various techniques, both mathematical and programming based, can be applied to the algorithm above in order to speed-up the response time of the processing circuitry 4C and thereby reduce lag between sensing the objects and providing the output signalling. In other cases, calculation of certain of the coefficients may be skipped to reduce the number of calculations to be performed by the processing circuitry 4C, thereby providing a slightly less accurate but quicker determination of the apportioned forces. For example, the calculation of the reversed distance coefficient Di may be skipped (i.e., not performed) and so Di in Equation (14) can be set to zero.

In some further implementations, the processing circuitry 4C is configured to perform further processing when calculating the coefficients Ai and Di to ensure these values are greater than a predefined minimum value; that is, to avoid Ai and Di being close to zero and thus impacting upon the determination of the force distribution. Any suitable mathematical processing may be performed to ensure this is the case. For example, the processing circuitry may be configured to output a pre-set minimum value $A_{min}$ or $D_{min}$ when the actual calculate value of Ai or Di drops below the pre-set minimum value $A_{min}$ or $D_{min}$ respectively. Alternatively, the values of the coefficients Ai or Di may be scaled to ensure an appropriate spread of values.

Thus there has been described a sensing apparatus comprising: a frame; a capacitive sensor comprising a sensing surface moveably mounted relative to the frame and configured to sense a plurality of objects at different locations over the sensing surface; a displacement sensor configured to detect the displacements of different regions of the sensing surface relative to the frame due to a net displacement load applied to the sensing surface by the objects; and a controller element configured to determine a centre of press location on the sensing surface corresponding to a location where the net displacement load acts based on the relative displacements of the different regions of the sensing surface, and configured to apportion the net displacement load to respective ones of the sensed objects based upon the locations of the sensed objects relative to the location of the centre of press.

In some situations, the above described third implementation provides situations in which the apportioned forces "jump" suddenly due to small movements of the locations of the sensed touches. In the arrangement shown in FIG. 8, there are three minimum angles between neighbouring touches, which can be labelled as T2-T3 (angle $\alpha 2$ or $\alpha 3$), T3-T4 (angle $\alpha 4$) and T1-T4 (angle $\alpha 1$). Now, suppose the position of touch T3 moves slowly towards touch T4 by rotating around the centre of press location P. The smallest angle relationships are maintained (although the values of the angles themselves will of course vary). Now suppose touch T3 continues to move by rotating about the centre of press location P to a position beyond touch T4—that is, the touch T3 is now located between T4 and T1. In this case, the minimum angles are not preserved—the minimum angles can be labelled as T2-T4, T3-T4 and T1-T3. During this transition (i.e., T3 moving beyond T4), the processing circuitry 4C uses different angular relationships to apportion the load. During this transition, the apportioned loads may jump slightly because of the different values being used. Although such behaviour is likely to be very rare, this may nevertheless be undesirable for certain applications and thus in a variation on the third implementation, the processing circuitry is configured to lock the active positions/configurations of the sensed touches.

In one example, the processing circuitry 4C uses a table where minimum angle pairs of touches are stored (i.e., the numbers of touches in a pair having a minimum angle therebetween, e.g., T2-T3, T3-T4, etc.). If no touches are detected, then the processing circuitry 4C is configured to clear the table of the stored pairs of touches. When a new touch is sensed, the processing circuitry 4C checks the table to see if the touch is listed in the table of the minimum angles—note that, in some cases, rather than simply listing the number of a touch, e.g., T1, the X, Y coordinates are used to identify the touches.

If the touch is not listed, the new touch is added and the processing circuitry performs the processing using the methods as described above. Here, a new touch is categorised as either an additional touch to those currently being used, e.g., when four touches are detected and a new, fifth touch is then further detected, or if a touch moves outside of an allowable range of co-ordinates that are assigned to that touch. For instance, suppose a detected touch is allowed to move within ±1 cm in the X and Y directions from the actual sensed position to be classified as that listed touch. Moving outside this range causes the touched to be classified as a new touch. The allowable range may be fixed for each touch or may be variable depending upon the configuration of the touches on the sensing surface 3A.

If the touch is listed, then regardless of the actual smallest angular relationships as measured on the sensing surface 3A, the processing circuitry 4C is configured to apportion the total force using the stored smallest angular relationships. Referring back to the situation above described with respect to FIG. 8, assuming the transition of touch T3 to a position beyond touch T4 is within an allowable range, then rather than the processing circuitry apportioning the total force using the actual smallest angular relationships (i.e., T2-T4, T3-T4 and T1-T3) the processing circuitry 4C uses the previously stored angular relationships (i.e., T2-T3, T3-T4 and T1-T4). It should be stressed that the processing circuitry does not apportion the total force using the previous angular values of these relationships but instead uses the new value of those angles according to the previous relationships. In this way the chance of a sudden "jump" or discrepancy in the apportioned load is minimised because the way in which the apportioned load is calculated is not switched/changed as the positions of already detected touches change.

It will be further appreciated that while specific materials and dimensions for various elements have been provided by way of specific example, in general the materials and overall geometry of the elements comprising the sensing apparatus may be selected according to the application at hand, for example, where a large or small area sensing surface is desired. The exact arrangement adopted for any specific information may be determined empirically, for example by testing the response of different configurations and selecting a configuration providing a desired response (for example in terms of sensitivity/rejection of spurious displacement detections). It will be further realised that while the above descriptions have focussed on a generally planar sensing element 6, the principles described herein are equally applicable to non-planar structures. For example, the same principles could be used to sense objects on a touch sensitive system that incorporates a curved outer surface.

It has generally been described above that the capacitive sensing element 3 is a single piece component and subsequently tilts from its at rest position when off-centre loads are applied thereto. However, in other implementations, the sensing surface 3A may be comprised of a plurality of sections, each section relatively moveable to the others. For example, each section may be considered as a region (e.g., the regions A-D shown in FIG. 4).

The sensing apparatus generally includes a microprocessor or suitable processing logic, to allow it to filter and adjust the raw measurements from the displacement sensor. This processing function may include calibration to store a displacement "baseline" at initial power-on or on reset/host command. It may also include measurement trimming to compensate for environmental changes that affect the sensor's raw signals, making them drift over time.

The controller element may be configured to make measurements of the relevant capacitive characteristic of the electrodes at an appropriate sampling rate having regard to the timescales on which the displacement is to be measured are expected to occur. For example, in the case of a user interface the sampling rate may correspond with that typically used for user input devices (e.g. corresponding to the rate at which the state of a mouse click button would be sampled).

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] Capacitive Sensors: Design and Applications by Larry K. Baxter, August 1996, Wley-IEEE Press, ISBN: 978-0-7803-5351-0

What is claimed is:

1. A sensing apparatus for determining relative amounts of force applied to a sensing surface at a plurality of locations, the sensing apparatus comprising:
   a capacitive sensor element comprising the sensing surface, wherein the capacitive sensor element is moveably mounted relative to a frame of the sensing apparatus;
   a displacement sensor element for detecting changes in the displacement of the capacitive sensor element relative to the frame;
   capacitive sensing circuitry coupled to the capacitive sensor element and configured to determine locations for a plurality of objects capacitively coupled to the sensing surface;
   displacement sensing circuitry coupled to the displacement sensor element and configured to determine changes in the displacement of the capacitive sensor element relative to the frame at a plurality of different locations due to displacement loads applied by the plurality of objects on the sensing surface; and
   processing circuitry configured to determine a location at which a net displacement load acts on the sensing surface from the determined changes in displacement of the capacitive sensor element relative to the frame for the plurality of different locations, and to establish relative amounts of the net displacement load applied by respective ones of the plurality of objects based on the determined locations of the objects relative to the determined location at which the net displacement load acts on the sensing surface,
   wherein the processing circuitry is configured to determine distances on the sensing surface between the locations of each of the plurality of objects and the location at which the net displacement load acts, and to establish relative amounts of the net displacement load applied by the respective ones of the objects based upon the determined distances.

2. The apparatus of claim 1, wherein the processing circuitry is configured to establish relative amounts of the net displacement load applied by the respective ones of the objects inversely proportional to the determined distance.

3. The apparatus of claim 1, wherein the processing circuitry is configured to establish relative amounts of the net displacement load applied by the respective ones of the objects based upon the spatial relationship of a given object to at least one other object.

4. The apparatus of claim 1, wherein the processing circuitry is further configured to determine the angles between pairs of objects about the location at which the net displacement load acts and, for each object, establish relative amounts of the net displacement load applied by the respective ones of the objects based additionally upon the smallest angle associated with the respective object.

5. The apparatus of claim 4, wherein the processing circuitry is configured to determine, for each object, a relative distance which is measure of the relative distance of the object to the location at which the net displacement load acts as compared to the distance to the location at which the net displacement load acts of another object, and is configured to establish relative amounts of the net displacement load applied by the respective ones of the objects based upon the relative distance associated with the object.

6. The apparatus of claim 5, wherein the relative distance is a relative distance to the location at which the net displacement load acts between pairs of sensed objects having the smallest angle therebetween about the location at which the net displacement load acts.

7. The apparatus of claim 4, wherein the processing circuitry is configured to establish relative amounts of the net displacement load applied by the respective ones of the objects based upon the product of a function of the associated smallest angle and the determined distance and/or relative distance for each object.

8. The apparatus of claim 1, wherein the processing circuitry is configured to establish relative amounts of the net displacement load applied by the respective ones of the objects by solving at least three simultaneous equations representing a balancing of components of projections of the apportioned loads on the sensing surface about the location at which the net displacement load acts in a first direction and a second orthogonal direction respectively, and by imposing the relationship that the net displacement load is equal to the summation of all relative amounts of the net displacement load.

9. The apparatus of claim 8, wherein each relative amount of the net displacement load is representable as a vector projected on the sensing surface about the location at which the net displacement load acts, each vector having a component in a first direction in the plane of the sensing surface and a component in a second, orthogonal direction in the plane of the sensing surface, and wherein the processing circuitry is configured to determine the magnitude of each of the vectors based on the summation of the components of the relative amounts of the net displacement load in the first direction being equal to zero, the summation of the components of the relative amounts of the net displacement load in the second, orthogonal direction being equal to zero, and the summation of the magnitudes of each apportioned load being equal to the total net displacement load.

10. The apparatus of claim 1, wherein the processing circuitry is configured to scale components of the locations of the objects and/or location at which the net displacement load acts in a first direction on the sensing surface differently to components in a second, orthogonal direction.

11. The apparatus of claim 1, wherein the processing circuitry is configured to output signalling including the location of each object on the sensing surface in addition to an indication of the relative amounts of the net displacement load established for each object.

12. The apparatus of claim 1, wherein the processing circuitry is configured to determine the location at which the net displacement load acts based upon the proportion of the total change in displacement of the sensing surface at the plurality of different locations and their position of the different locations relative to the sensing surface.

13. The apparatus of claim 1, wherein the processing circuitry is configured to determine the net displacement load based upon a summation of the relative change in displacements at all of the different locations on the sensing surface.

14. A device comprising the apparatus of claim 1.

15. A sensing apparatus for determining relative amounts of force applied to a sensing surface at a plurality of locations, the sensing apparatus comprising:

a capacitive sensor element comprising the sensing surface, wherein the capacitive sensor element is moveably mounted relative to a frame of the sensing apparatus;

a displacement sensor element for detecting changes in the displacement of the capacitive sensor element relative to the frame;

capacitive sensing circuitry coupled to the capacitive sensor element and configured to determine locations for a plurality of objects capacitively coupled to the sensing surface;

displacement sensing circuitry coupled to the displacement sensor element and configured to determine changes in the displacement of the capacitive sensor element relative to the frame at a plurality of different locations due to displacement loads applied by the plurality of objects on the sensing surface; and processing circuitry configured to determine a location at which a net displacement load acts on the sensing surface from the determined changes in displacement of the capacitive sensor element relative to the frame for the plurality of different locations, and to establish relative amounts of the net displacement load applied by respective ones of the plurality of objects based on the determined locations of the objects relative to the determined location at which the net displacement load acts on the sensing surface;

wherein the processing circuitry is configured to establish relative amounts of the net displacement load applied by the respective ones of the objects by solving at least three simultaneous equations representing a balancing of components of projections of the apportioned loads on the sensing surface about the location at which the net displacement load acts in a first direction and a second orthogonal direction respectively, and by imposing the relationship that the net displacement load is equal to the summation of all relative amounts of the net displacement load; and wherein, when the plurality of objects is N, N being an integer greater than three, the processing circuitry is configured to introduce N−3 additional relationships, wherein each additional relationship is a relationship between a given object and an adjacent object.

16. The apparatus of claim 15, wherein the N−3 relationships include a relationship between the distances of the given object and the adjacent object to the location at which the net displacement load acts, wherein the adjacent object is an object having the smallest angle about the location at which the net displacement load acts in the plane of the sensing surface from the given object.

17. A method for determining relative amounts of force applied to a sensing surface of a capacitive sensor element at a plurality of locations, the capacitive sensor element moveably mounted relative to a frame, the method comprising:

determining locations for a plurality of objects capacitively coupled to the sensing surface of the capacitive sensor element;

calculating a net displacement load based on the changes in displacement of the capacitive sensor element at a plurality of different locations due to displacement loads applied by the plurality of objects on the sensing surface;

determining a location at which a net displacement acts on the sensing surface from the determined changes in displacement of the capacitive sensor element relative to the frame for the plurality of different locations;

establishing relative amounts of the net displacement load applied by respective ones of the plurality of objects based upon the determined locations of the objects relative to the determined location at which the net displacement load acts on the sensing surface;

determining distances on the sensing surface between the locations of each of the plurality of objects and the location at which the net displacement load acts; and establishing relative amounts of the net displacement load applied by the respective ones of the objects based upon the determined distances.

* * * * *